(12) United States Patent
Jensen

(10) Patent No.: US 12,274,277 B2
(45) Date of Patent: Apr. 15, 2025

(54) ICE CREAM STICK INSERTION DEVICE FOR ICE CREAM PRODUCTS AND METHOD FOR INSERTING A STICK INTO ICE CREAM PRODUCTS

(71) Applicant: Gram Equipment A/S, Kolding (DK)

(72) Inventor: Klaus Wittrup Jensen, Agerskov (DK)

(73) Assignee: GRAM EQUIPMENT A/S, Kolding (DK)

( * ) Notice: Subject to any disclaimer, the term of this patent is extended or adjusted under 35 U.S.C. 154(b) by 0 days.

(21) Appl. No.: 18/591,449

(22) Filed: Feb. 29, 2024

(65) Prior Publication Data

US 2024/0196927 A1    Jun. 20, 2024

Related U.S. Application Data

(63) Continuation of application No. 17/253,751, filed as application No. PCT/DK2019/050199 on Jun. 21, 2019, now Pat. No. 11,985,988.

(30) Foreign Application Priority Data

Jun. 21, 2018    (DK) ............................ PA 2018 70428

(51) Int. Cl.
*A23G 9/26*    (2006.01)
*A23G 9/22*    (2006.01)
(Continued)

(52) U.S. Cl.
CPC ............. *A23G 9/265* (2013.01); *A23G 9/228* (2013.01); *A23G 9/503* (2013.01); *G01B 11/0608* (2013.01); *G01C 3/02* (2013.01)

(58) Field of Classification Search
CPC ........ A23G 9/265; A23G 9/228; A23G 9/503; A23G 9/26; A23G 7/0031; A23G 7/81;
(Continued)

(56) References Cited

U.S. PATENT DOCUMENTS 3,070,259 A * 12/1962 Glass ................... A23G 7/0031
221/14

FOREIGN PATENT DOCUMENTS

CN    201004980 Y  *  1/2008
CN    203523723 U  *  4/2014
(Continued)

*Primary Examiner* — Emmanuel E Duke
(74) *Attorney, Agent, or Firm* — CANTOR COLBURN LLP

(57) ABSTRACT

A method for inserting a stick into an ice cream product with a stick pusher, the stick pusher including an actuator for linear and reciprocating movement, a control unit controlling the actuator, a sensor for measuring at least one of: the stick's position in relation to the ice cream product's height, horizontal position in relation to the product's end point, and angle in relation to the product's end point, where the control unit is connected to the sensor, the method including, at a start time, pushing a stick into an ice cream product to a stick position by accelerating the stick pusher in a first direction, deaccelerating the stick pusher to a speed equal to zero and moving the stick pusher to the starting position, where the control unit controls the stick pusher's start time based on measurements from the at least one sensor.

22 Claims, 6 Drawing Sheets

(51) Int. Cl.
*A23G 9/50* (2006.01)
*G01B 11/06* (2006.01)
*G01C 3/02* (2006.01)

(58) Field of Classification Search
CPC ...... G01B 11/0608; G01B 11/02; G01C 3/00; G01C 3/02
See application file for complete search history.

(56) References Cited

FOREIGN PATENT DOCUMENTS

| | | | | |
|---|---|---|---|---|
| WO | WO-2014161894 A1 | * | 10/2014 | ............. A23G 9/265 |
| WO | WO-2017055406 A1 | * | 4/2017 | ............... A23G 9/22 |

* cited by examiner

ICE CREAM STICK INSERTION DEVICE FOR ICE CREAM PRODUCTS AND METHOD FOR INSERTING A STICK INTO ICE CREAM PRODUCTS

CROSS REFERENCE TO RELATED APPLICATIONS

This application is a continuation of U.S. patent application Ser. No. 17/253,751 filed on Dec. 18, 2020 as the U.S. National Stage of International Patent Application Number PCT/DK2019/050199 filed on Jun. 21, 2019 claiming priority to Danish Patent Application Number PA201870428 filed on Jun. 21, 20218, all of which said applications are herein incorporated by reference in their entirety.

FIELD OF THE INVENTION

The present invention relates to a stick insertion device for inserting a stick in an ice cream product extruded from an extrusion jet at a height seen in the extrusion jet direction, and at least one end point which is substantially parallel to the direction of extrusion and into which the stick is inserted with orientation substantially perpendicular to the direction of extrusion,
wherein the stick insertion device comprises:
a stick pusher, which can adopt a linear and reciprocating movement,
an actuator with a primary and secondary outer position, which is used to activate the stick pusher,
a servo mechanism for controlling the actuator's movement,
a control unit, connected to the servo mechanism.

The present invention further relates to a method of inserting a stick into an ice cream product extruded from an extrusion jet, and which has a height set in the extrusion jet's direction, with at least one end point, by means of a stick insertion device, which is substantially parallel to the direction of extrusion and into which the stick is inserted with orientation on substantially perpendicular to the direction of extrusion,
wherein the stick insertion device comprises:
a stick pusher, which can adopt a linear and reciprocating movement,
an actuator,
a servo mechanism to activate the actuator,
a control unit, connected to the servo mechanism, and
at least one sensor.

BACKGROUND OF THE INVENTION

There are in existence stick insertion devices for ice cream products which are pneumatically driven. These stick insertion devices do not have sensors for monitoring of stick insertion. Furthermore, the stroke length cannot be varied in these products.

Consequently, the depth of insertion cannot be varied and corrected in these stick insertion devices. The angle of the ice cream stick using these stick insertion devices can only be varied by tilting the whole stick insertion device in relation to the ice cream product. This is a manual process that requires specialized knowledge and experience for manual intervention using a setting screw by an operator, who must necessarily be present during production.

Furthermore, WO2014/161894 describes stick insertion devices with a linear servo actuator. These stick insertion devices do not have sensors for monitoring of stick insertion.

Subsequently the speed and time of insertion of the stick are not monitored and varied. Consequently it is not possible to adjust the insertion process.

There are no stick insertion devices that can autonomously monitor the insertion of the stick and carry out adjustments to the stick insertion process.

The disadvantages of the existing stick insertion devices are that:
waste is generated, due to the products being made outside of tolerances
waste is generated due to further processing of products outside of tolerances
the operators have to be trained in the use and manual adjustment of the stick insertion devices warnings cannot be generated to the operator if the system operates outside of stated tolerances damaged sticks cannot be detected
the next stages in the preparation process cannot be adapted to the actual stick position in the product.

OBJECT OF THE INVENTION

The object of the present invention is to provide a stick insertion device to overcome these disadvantages.

A further object of the present invention is to provide a method of inserting a stick in an ice cream product using a stick insertion device which overcomes these disadvantages.

DESCRIPTION OF THE INVENTION

This is achieved according to the present invention using a stick insertion device of the type mentioned in the preamble which is distinctive in that
the stick insertion device comprises:
at least one sensor for measuring the position of the stick relative to the height of the ice cream product, horizontal position relative to the end point of the ice cream product, and angle relative to the end point of the ice cream product,
that the control unit is connected to the at least one sensor and the servo mechanism, that the control unit is adapted to control the stroke length of the servo mechanism, based on signal s from at least one sensor,
that the control unit is adapted to control the starting time of the servo mechanism and the end time of the stick insertion based on signals from the aforementioned at least one sensor.

Typically, the ice cream product will be cut free from the extrusion jet after the stick is inserted. Alternatively, the ice cream product may be cut from the extrusion jet before or while the stick is being inserted.

The at least one sensor may be a sensor that scans the entire ice cream product. Alternatively, the at least one sensor may be made up of several individual sensors, each measuring a single point or part of the stick.

The actuator has a primary and a secondary outer position. During the insertion of the stick the actuator must not reach the outer positions. This implies that the stroke length is less than the maximum stroke length. Consequently it is possible to increase the stroke length when an adjustment is necessary.

As described in this patent application the servo mechanism is a mechanism with feedback. The servo mechanism activation can be of any type, for example electronic, pneumatic or hydraulic.

According to a further embodiment, the stick insertion device according to the invention description is distinctive in that the at least one sensor is designed as three singlepoint laser measuring units, wherein a first sensor that measures the distance perpendicular to the stick insertion direction is adjusted so that it measures the distance in the direct vicinity of the ice cream product's end point, so that the stick's vertical positioning in the ice cream product's end point is measured, a second sensor, that measures the perpendicular distance of the stick insertion direction is adjusted, so that it measures the distance in a greater distance from the ice cream product's end point than the first sensor, and thus the angle adjustment of the stick be determined from the measurements of the first and second sensors, and a third sensor, measuring the perpendicular distance of the stick insertion direction, wherein the sensor is positioned in an area where the stick's outer section is desired in the finished ice cream product, so that it measures if the stick is in position in the target area following the insertion of the stick in the ice cream product.

The first sensor will typically measure a distance of 1 mm to 5 from the end point, preferably 2 mm to 4 mm from the end point. The secondary sensor will measure a distance of 30 mm to 50 mm from the end point, optimally 35 mm to 45 mm from the end point.

Calibration measurements can be made on the surface of a product tray using any of the sensors. The product tray is the object that holds the ice cream product or which the ice cream product lies on. When no ice cream product is in the measurement area of the sensor(s), the distance to the product tray's end point can be measured using the sensor(s).

The third sensor is used to monitor the depth of the stick in the ice cream product and to keep the insertion depth within a certain tolerance range. This is achieved by measuring whether the stick is in position in the measurement area of the third sensor after the stick is inserted into the ice cream product.

If the stick is correctly positioned, the stroke length for the servo mechanism and thus the stroke length for the stick pusher is adjusted so that the stick inserted into the next ice cream product will be inserted further in. A typical value would be a 0.1 mm further stroke length.

If, on the other hand, the third sensor measures that there is no stick inserted into the target area after insertion of the stick, the servo mechanism's stroke length will be reduced. A typical value for reduction of the stroke length would be 0.1 m. The stroke length of the next ice cream product will thus be reduced.

This adjustment of the stroke length between each insertion of a stick in an ice cream product will ensure that the insertion depth is maintained within a tolerance range within the desired insertion depth. This is a fully automated part of the production. Subsequently no manual intervention by an operator is required.

According to a further embodiment, the stick insertion device described in the invention is distinctive in that the at least one sensor is configured as a laser scanner.

According to a further embodiment, the stick insertion device described in the invention is distinctive in that the at least one sensor is configured as a camera, that constitutes part of a visual system.

According to a further embodiment, the stick insertion device is distinctive in that the at least one sensor is configured as a combination of a camera and one or more measurement devices.

According to a further embodiment, the stick insertion device described in the invention is distinctive in that the actuator is configured as a servo motor, connected to the stick pusher with a crank and a connection rod, with connecting rod shanks on either side of the connection rod.

The crank can be designed as a disc.

A further aspect of the invention is that a method of the aforementioned type is distinctive in that the method comprises the following steps:
monitoring of the insertion length of the stick with the at least one sensor,
monitoring of the angle setting of the stick with the at least one sensor,
monitoring of the speed of the stick with the at least one sensor or the servo mechanism,
adjustment of the speed of the stick pusher over time to achieve the desired angle setting of the stick in the ice cream product as a result of signals received from the at least one sensor and/or the servo mechanism,
control of the servo mechanism's stroke length as a result of signals received from the at least one sensor and/or the servo mechanism,
control of the starting time of the servo mechanism and the end time of insertion of the stick based on measurements of the height of the stick in the end point of the ice cream product, the height being measured in the direction of extrusion.

The method can be used with any embodiment of the stick insertion device according to the description of the invention.

Monitoring can essentially be done continuously from the start time to end time for the insertion of the stick. Alternatively the monitoring can be carried out at specific times or at intervals.

The speed of the stick pusher is of primary importance. The timing of the speed can be described by the following intervals, but is not limited to such intervals or the outlined sequence. At the start of the insertion of the stick there will be a ramp-up interval with an increase in the speed of the stick pusher. Then an interval will be created with maximum speed. Maximum speed implies the maximum speed during the actual insertion of the stick, not the maximum speed of the stick pusher which the actuator can produce. Subsequently, there will be a ramp-down interval causing the speed to decrease. When the stick reaches the desired end position, the speed is zero. Subsequently the stick pusher will move in the opposite direction until the timed ending of the stick insertion. The speed will then increase to a "ramp-up return" interval. Subsequently there will be an interval with a maximum speed range. At the time at which the stick pusher reaches the starting position, the speed will be zero. This time point is the end time of the insertion process. Subsequently there may be a waiting period until the start of the insertion of the next stick.

In a further aspect of the invention, the method may further comprise the following steps:
triggering a warning to an operator if control of the servo mechanism cannot be adjusted within a predetermined tolerance interval.

The warning may be a visual alert in the form of a lamp. Alternatively in the form of an aural signal. The warning may also be an onscreen display message. The warning may also be transmitted as a text message. The different types of warning can also be transmitted in combination.

In a further aspect of the invention, the method may further comprise the following steps:
the end position of the stick relative to the food product is stored in a memory in the control unit after insertion of the stick.

In a further aspect of the invention, the method may further comprise the following steps:
use of data for the end position of the stick for the separation of products outside a predetermined tolerance range.

In a further aspect of the invention, the method may further comprise the following steps:
use of data for the end position of the stick in a subsequent processing step of the ice cream product to optimize the processing process.

Optimisation of the processing process may, for example, be the adjustment of grip ping tools to the exact position of the stick in subsequent processing steps. For example, when dipping into liquid chocolate.

In a further aspect, the method may further comprise the following steps:
detection of damaged sticks due to signals from the at least one sensor and/or the servo mechanism.

In a further aspect, the method may further comprise the following steps:
separation of ice cream products outside of tolerances.

In a further aspect, the method may further comprise the following steps:
separation of ice cream products with damaged sticks.

DESCRIPTION OF THE DRAWINGS

The invention will now be explained in more detail with reference to the accompanying drawings, in which.

DETAILED DESCRIPTION OF THE INVENTION

Figure 1:
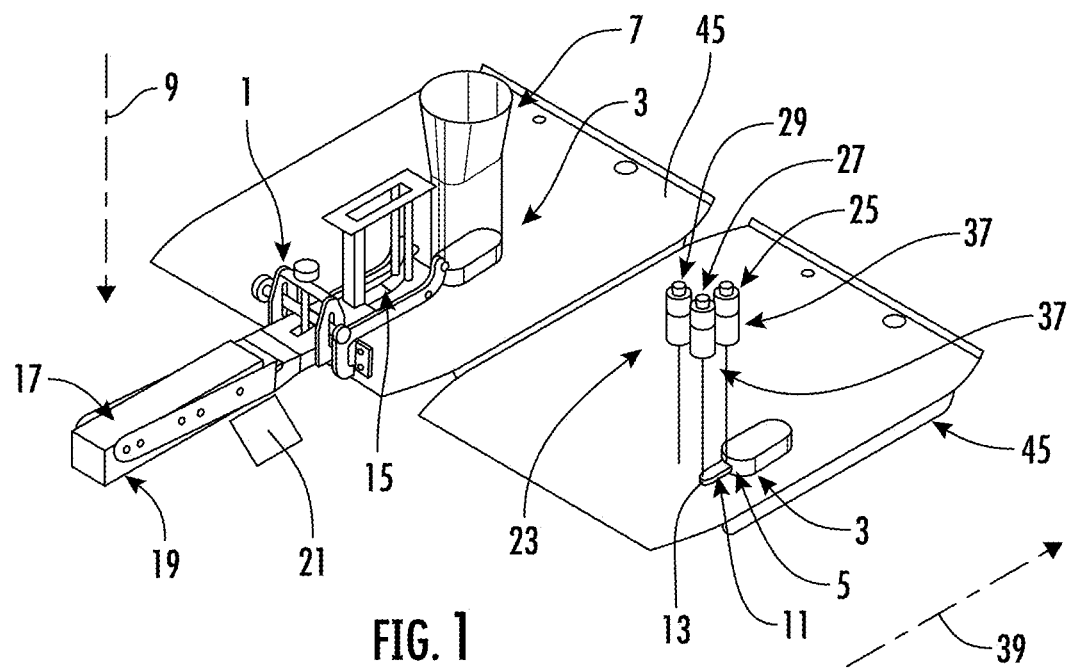
FIG. 1 shows a stick insertion device according to the invention, seen in perspective.

FIG. 1. show's a stick insertion device 1 according to the invention. The stick insertion device 1 is calculated to insert a stick 11 in an ice cream product 3. The stick is inserted into an end point 5 of the ice cream product 3. The stick insertion device comprises a stick pusher 15. The stick pusher can make a linear and reciprocating movement.

The stick insertion device also comprises an actuator 17. The actuator is used to activate the stick pusher 15. A servo mechanism 19 controls the actuator's movement. The servo mechanism 19 is connected to a control unit 21. Furthermore, the stick insertion device comprises at least three sensors: a first sensor 25, a second sensor 27 and a third sensor 29. In FIG. 1, 23 describes a group of sensors.

The first sensor 25 measures a distance perpendicular to the stick's 11 insertion direction 39. The distance is measured in the immediate vicinity of the end point 5 of the ice cream product 3. Thus, the height of the stick in the end point 5 of the ice cream product 3 can be measured.

The second sensor 27 measures a distance perpendicular to the stick's 11 insertion direction 39 at a greater distance than from the ice cream product's 3 end point 5 than the first sensor 25. The angular position of the pin can thus be determined from the measurements from the first sensor 25 and second sensor 27.

The third sensor 29 measures a distance perpendicular to the stick insertion direction. The third sensor is located immediately where the outer end 13 of the stick is desired after insertion of the stick into the ice cream product.

The ice cream product is extruded from an extrusion jet 7 in the extrusion direction 9.

The ice cream product 3 is placed on a tray 45.

The third sensor is used to monitor the depth 63 of the stick in the ice cream product, and to hold the insertion jet 63 within the tolerance interval. This is achieved by measuring whether the stick is within the measuring area of the third sensor 29 after the stick 11 has been inserted into the ice cream product 3.

If the stick is in position, the stroke of the servo mechanism 19 and hence the stroke length of the stick pusher 15 is adjusted, so that the stick 11 for the next ice cream product 3 is inserted further in. A typical value would be a 0.1 mm longer stroke length.

If, on the other hand, the third sensor 29 measures that there is no stick in the measuring area after insertion of the stick, the stroke length of the servo mechanism 19 will be reduced. A typical value for reduction of the stroke length would be 0.1 mm. The stroke length of the next ice cream product will thus be reduced.

This adjustment of the stroke length between each insertion of a stick in an ice cream product will ensure that the insertion depth is maintained within a tolerance range within the desired insertion depth. This is a fully automated part of the production. Subsequently no manual intervention by an operator is required.

Figure 2:
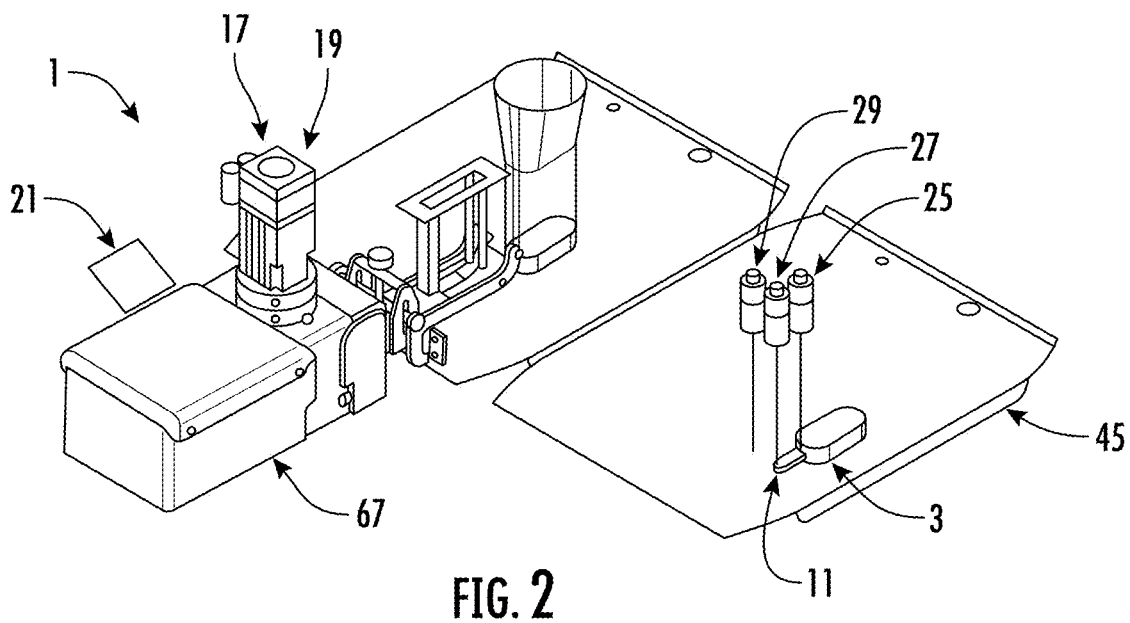
FIG. 2 shows a stick insertion device according to the invention, seen in perspective.

FIG. 2 show's a stick insertion device 1 according to the description of the invention with an actuator 17, a servo mechanism 19 and a control unit 21. A screen 67 screens off part of the stick insertion device against outside influence.

Figure 3:
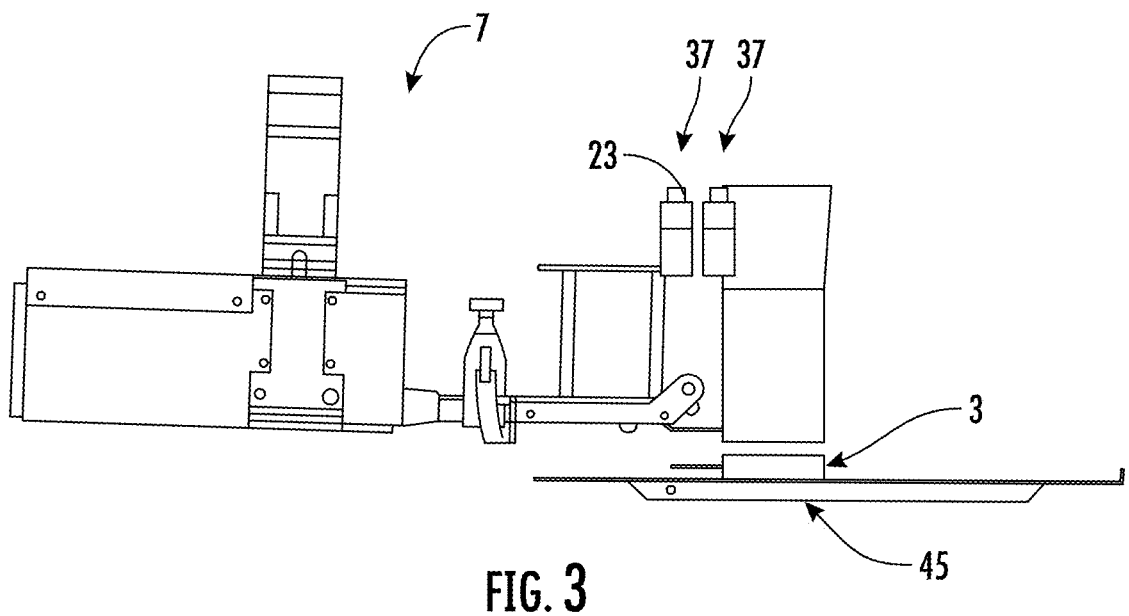
FIG. 3 shows a stick insertion device according to the invention, seen from one side.

FIG. 3 shows the same design of the stick insertion device 1, as seen in FIG. 2. The at least one sensor 23 is designed as three single point laser target units 31 (only two are visible in FIG. 2).

Figure 4:
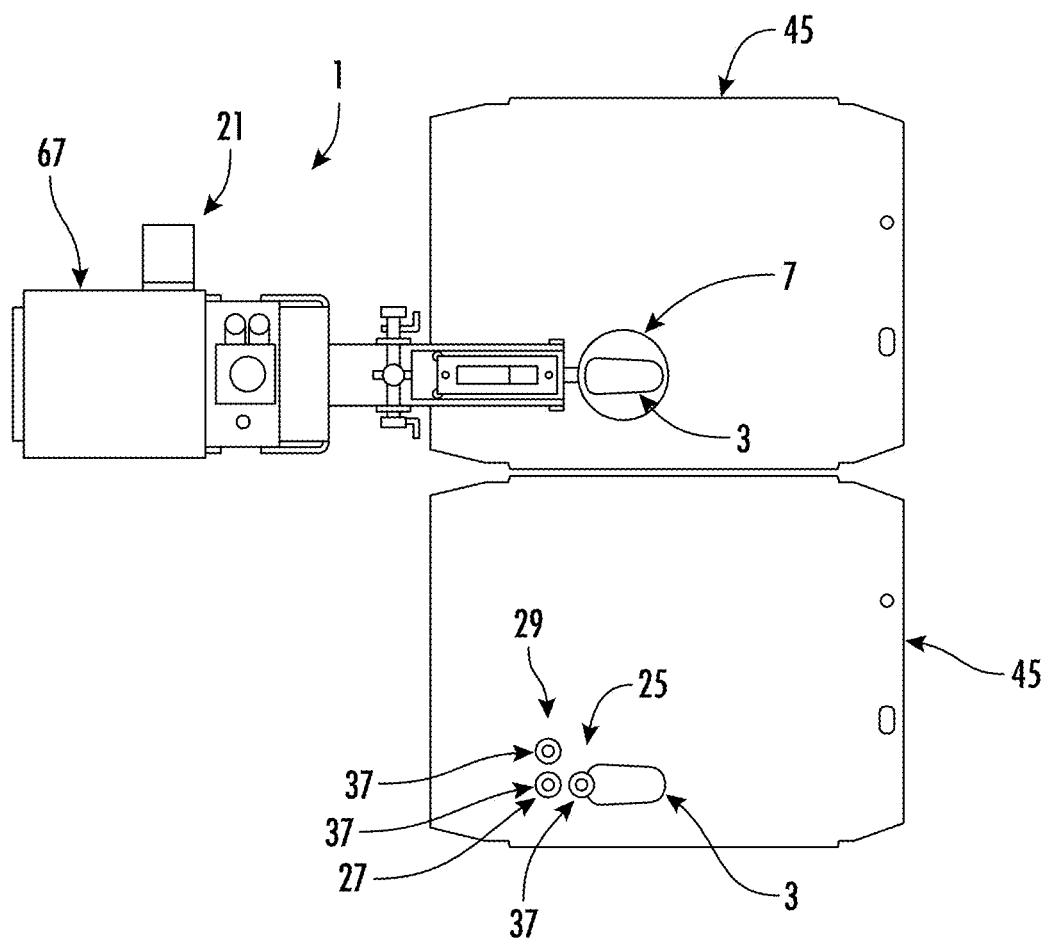
FIG. 4 shows a stick insertion device according to the invention, seen from above

FIG. 4 shows the same embodiment of the stick insertion device 1, as seen in FIGS. 2 and 3, but seen from above.

Figure 5:
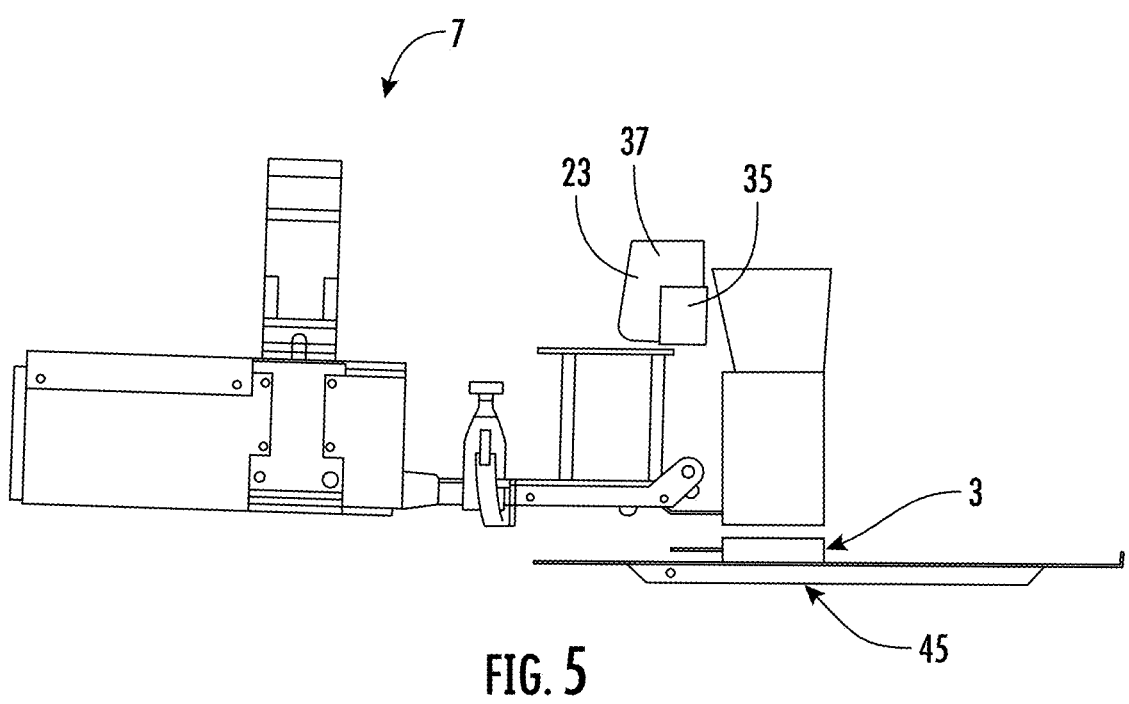
FIG. 5 shows a stick insertion device according to the invention, seen from one side.

FIG. 5 show's a further embodiment of the stick insertion device 1 according to the description of the invention, but seen from the side. The at least one sensor 23 is designed as a camera 35, that constitutes part of a visual system 37. The camera and visual system can simultaneously dictate the insertion depth and angle setting for the stick. Furthermore, by means of the visual system and the camera, broken or erroneous sticks can be identified.

Figure 6:
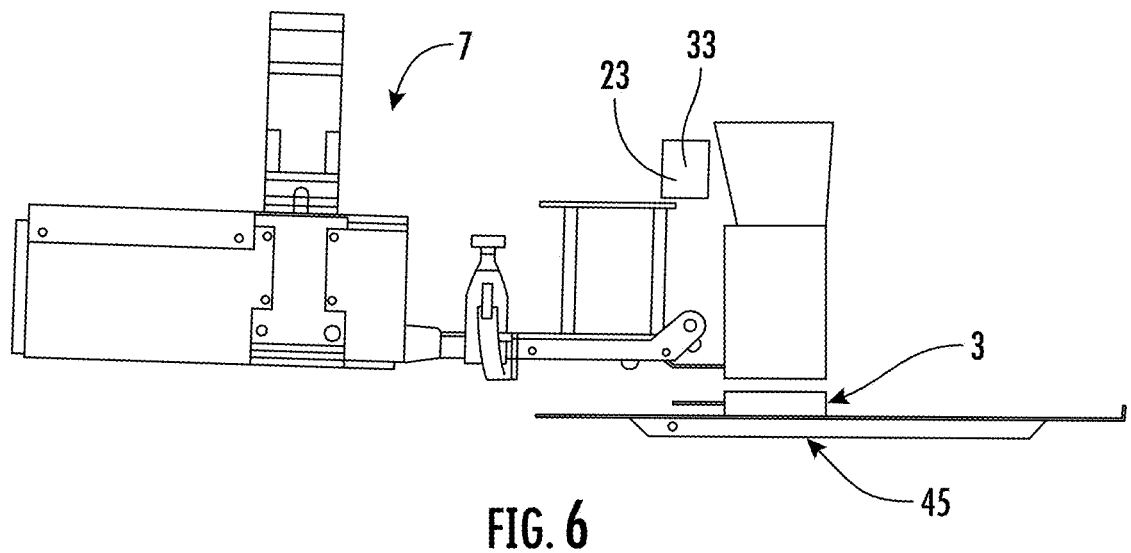
FIG. 6 shows a stick insertion device according to the invention, seen from one side.

FIG. 6 shows a further embodiment of the stick insertion device 1 according to the description of the invention, seen from the side. The at least one sensor 23 is designed as a laser scanner 33. The laser scanner can simultaneously measure the stick insertion depth and angle setting in the ice cream product 3.

Figure 7:
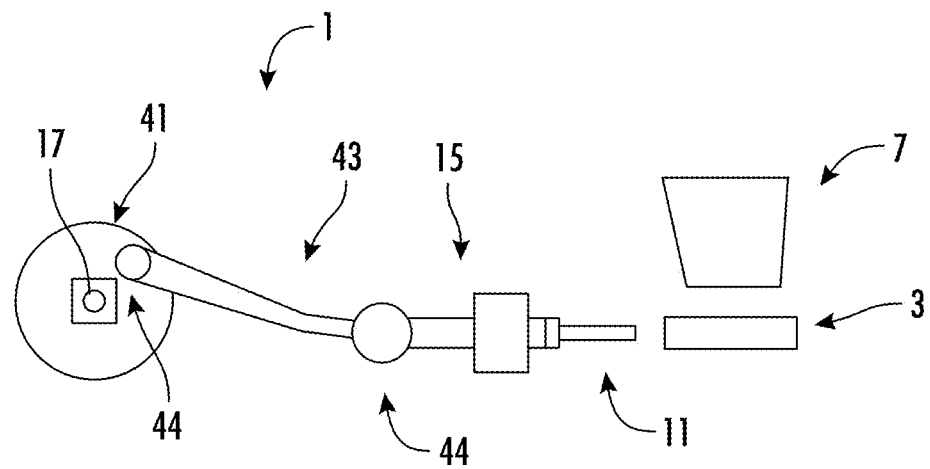
FIG. 7 shows a sketch of a stick insertion device according to the invention, seen from one side.

FIG. 7 shows a sketch of a stick insertion device 1 according to the description of the invention. The stick insertion device comprises an actuator 17, designed as a servo motor. The actuator rotates. It is connected to the stick pusher 15 with a crank 41 and a connecting rod 43. There are connecting rod guides 44 on both sides of the connecting rod 43. The crank is designed as a circular disc.

Figure 8:
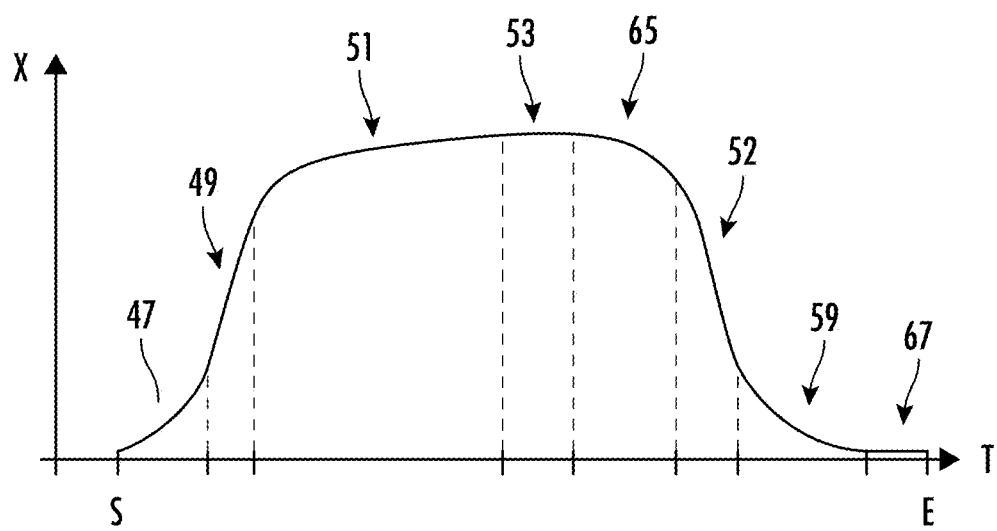
FIG. 8 shows a sketch of a time position curve for a stick insertion device according to the invention.

FIG. 8 shows an example of a time position curve for a stick pusher. It can be seen how the speed of the stick pusher can vary over time. In the Y axis the position of the stick pusher is shown, and consequently the stick marked with "X" In the X axis time is shown marked with "Tv At the start time "S" the stick pusher is still. In a first ramp-up interval 47 the speed of the stick pusher increases in the insertion direction, until the desired top speed is achieved.

The stick pusher is then advanced at the desired top speed in a first peak speed interval 49

Thereafter the speed is reduced in a first ramp-down interval 51.

Then there is a first waiting interval 53, where the stick pusher stands still. The first waiting interval can be zero seconds. That is to say the waiting period can be skipped.

Subsequently there will be another ramp-up interval 55, where the speed increases in the opposite direction of the insertion direction 39.

Thereafter there is a second top speed interval 57, where the stick pusher moves at the desired top speed opposite to the insertion direction.

Then the stick pusher speed decreases in a third ramp-down interval 59, until the stick pusher comes to a standstill.

Finally there is another waiting interval 61, where the stick pusher stands still until the final time "E", or until the next stick insertion starts.

Figure 9:
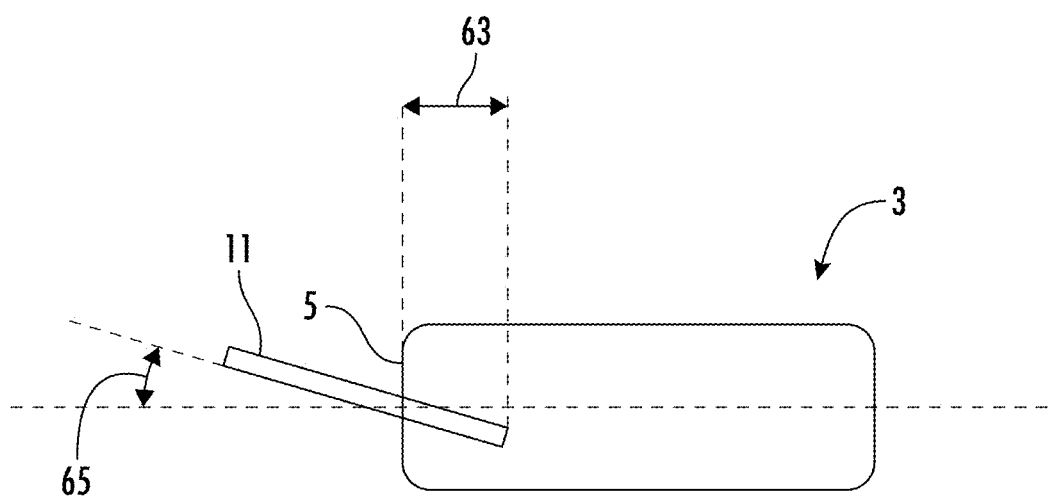
FIG. 9 shows a sketch of an ice cream product with stick.
I. Stick Insertion Device
3. Ice cream product
5 End point, ice cream product
7 Extrusion jet
9. Extrusion direction
II. Stick
13. Outer end, stick
15. Stick pusher
17. Actuator
19. Servo mechanism
21. Control unit
23 Sensor
25. First sensor
27. Second sensor
29. Third sensor
31. Singlepoint laser target unit
33. Laser scanner
35. Camera
37. Visual system
39. Insertion direction
41 Crank
43. Connection rod
44. Connecting rod shank
45. Tray
47 First ramp-up interval
49. First maxspeed interval
51. First ramp-down interval
53. First pause interval
55. Second ramp-up interval
57. Second maxspeed interval
59. Third ramp-down interval
61. Second pause interval
63. Depth, insertion depth
65 Angle
67. Screening In describing the figures, identical or similar elements will be designated by the same reference designators in the various figures. Consequently there will be no explanation for all details in connection with each figure/embodiment.

FIG. 9 shows a sketch of an ice cream product 3 with stick 11.

The sketch shows what is understood by the depth 63 of the stick 11 in the ice cream product 3. The depth 63 is also described as the insertion depth.

Furthermore, the sketch shows the angle 65 of the stick 11 relative to the ice cream product 3. This angle is determined when the stick angle is measured.

The invention claimed is:

1. A method for inserting a stick into an ice cream product with a stick pusher comprising:
   said stick pusher including an actuator capable of making a linear and reciprocating movement,
   a control unit controlling said actuators movement,
   at least one sensor for measurement of at least one of: the stick's position in relation to the ice cream product's height, horizontal position in relation to the ice cream product's end point, and angle in relation to the ice cream product's end point, wherein the control unit is connected to the at least one sensor,
   at a start time pushing a stick into an ice cream product to a stick position by accelerating said stick pusher in a first direction from a starting position,
   deaccelerating said stick pusher to a speed equal to zero and moving said stick pusher back to said starting position,
   wherein the control unit is connected to control the stick pusher's start time for the insertion of the stick based on measurements from the at least one sensor.

2. The method according to claim 1, wherein said actuator may be any type of electronic, pneumatic or hydraulic.

3. The method according to claim 1, wherein said actuator is controlled by a servo mechanism.

4. The method according to claim 1, wherein the method comprises a waiting period until pushing a next subsequent stick by accelerating said stick pusher.

5. The method according to claim 1, wherein said position of said stick is monitored continuously.

6. The method according to claim 1, wherein the method further comprises a step of triggering a warning to an operator if said stick position is out of a predetermined tolerance, and wherein said warning may be a visual alert, aural signal, an onscreen message on a display, a transmitted text message or any combination thereof.

7. The method according to claim 1, wherein the method comprises a step for storing the position of the stick after being inserted into the ice cream product into a control unit as data.

8. The method according to claim 7, wherein said data is used to optimize a gripping tool downstream said stick-insertion when gripping the stick of said ice cream product or optimize inserting said next subsequent stick into an ice cream product.

9. The method according to any of claim 1, wherein said stick position is either within or without a predetermined tolerance, wherein said tolerance is used to separate ice cream products.

10. The method according to claim 1, wherein said ice cream product is extruded ice cream product.

11. The method according to claim 1, wherein said stick is inserted into an ice cream product prior to, during or after cutting in an ice cream extrusion process.

12. A method for inserting a stick into an ice cream product with a stick pusher comprising:
- said stick pusher including an actuator capable of making a linear and reciprocating movement,
- a control unit controlling said actuators movement,
- at least one sensor for measurement of at least one of: the stick's position in relation to the ice cream product's height, horizontal position in relation to the ice cream product's end point, and angle in relation to the ice cream product's end point, wherein the control unit is connected to the at least one sensor,
- pushing a first stick into an ice cream product to a first stick position by accelerating said stick pusher in a first direction from a starting position,
- deaccelerating said stick pusher to a speed equal to zero and moving said stick pusher back to said starting position,
- measuring at least one of: the first stick's position in relation to the ice cream product's height, first stick's horizontal position in relation to the ice cream product's end point, and first stick's angle in relation to the ice cream product's end point,
- pushing a second stick into an ice cream product by accelerating said stick pusher in said first direction from said starting position, wherein said pushing a second stick is based on said at least one of said measured: the first stick's position in relation to the ice cream product's height, first stick's horizontal position in relation to the ice cream product's end point, and first stick's angle in relation to the ice cream product's end point.

13. The method according to claim 12, wherein said actuator may be any type of electronic, pneumatic or hydraulic.

14. The method according to claim 12, wherein said actuator is controlled by a servo mechanism.

15. The method according to claim 12, wherein the method comprises a waiting period until pushing said second stick by accelerating said stick pusher.

16. The method according to claim 12, wherein said position of said first stick is monitored continuously.

17. The method according to claim 12, wherein the method further comprises a step of triggering a warning to an operator if said first stick position is out of a predetermined tolerance, and wherein said warning may be a visual alert, aural signal, an onscreen message on a display, a transmitted text message or any combination thereof.

18. The method according to claim 12, wherein the method comprises a step for storing the position of the first stick after being inserted into the ice cream product into a control unit as data.

19. The method according to claim 18, wherein said data is used to optimize a gripping tool downstream said stick-insertion when gripping the stick of said ice cream product or optimize inserting said next subsequent stick into an ice cream product.

20. The method according to any of claim 12, wherein said first stick position is either within or without a predetermined tolerance, wherein said tolerance is used to separate ice cream products.

21. The method according to claim 12, wherein said ice cream product is extruded ice cream product.

22. The method according to claim 12, wherein said stick is inserted into an ice cream product prior to, during or after cutting in an ice cream extrusion process.

* * * * *